United States Patent [19]

Hörmann

[11] Patent Number: 5,241,873
[45] Date of Patent: Sep. 7, 1993

[54] TRANSMISSION THAT CONVERTS A ROTARY INTO A TRANSLATIONAL MOTION

[75] Inventor: Michael Hörmann, Marienfeld, Fed. Rep. of Germany

[73] Assignee: Steuerungstechnik GmbH Hörmann KG Antriebs- und & Co. Produktions, Marienfeld, Fed. Rep. of Germany

[21] Appl. No.: 711,178

[22] Filed: Jun. 3, 1991

[30] Foreign Application Priority Data

Jun. 6, 1990 [DE] Fed. Rep. of Germany ... 9006391[U]

[51] Int. Cl.⁵ .......................... F16H 1/18; F16H 53/00
[52] U.S. Cl. ..................................... 74/424.6; 74/567; 74/569; 192/142 R
[58] Field of Search .................... 74/424.5, 424.6, 425, 74/569, 567, 89.2; 192/142 R

[56] References Cited

U.S. PATENT DOCUMENTS

| | | | |
|---|---|---|---|
| 2,574,657 | 11/1951 | Pierce | 74/424.6 X |
| 4,641,806 | 2/1987 | Pipon et al. | 74/424.6 X |
| 4,726,247 | 2/1988 | Hormann | 74/424.6 |
| 4,765,651 | 8/1988 | Unger | 74/424.6 X |
| 4,819,495 | 4/1989 | Hormann | 74/424.6 |
| 4,827,668 | 5/1989 | Bechtold | 74/424.6 X |

*Primary Examiner*—Rodney H. Bonck
*Assistant Examiner*—Andrea Pitts
*Attorney, Agent, or Firm*—Max Fogiel

[57] ABSTRACT

Transmission that converts a rotary into a translational motion and is preferably attached to a motorized drive assembly, with a rotary drive mechanism and a translationally channeled motion-transmitting component that is attached to the drive mechanism in the vicinity of a track and driven by the drive mechanism. A controller wheel is attached to the motion-transmitting component by way of a cogged gear that converts the translational motion of the motion-transmitting component into a rotary motion on the part of the activating wheel. At least one activating component on the controller wheel engages at least one switch in accordance with the angle of rotation of the controller wheel.

10 Claims, 5 Drawing Sheets

TRANSMISSION THAT CONVERTS A ROTARY INTO A TRANSLATIONAL MOTION

BACKGROUND OF THE INVENTION

The invention concerns a transmission that converts a rotary into a translational motion and is preferably attached to a motorized drive assembly, especially for advancing masses like door panels out along a prescribed and correctively variable extent, with a rotary drive mechanism and a translationally channeled motion-transmitting component that is attached to the drive mechanism, especially by a positively interlocking transmitting articulation, in the vicinity of a track and driven by the drive mechanism.

SUMMARY OF THE INVENTION

The object of the invention is to provide such a drive mechanism with a device that dictates, preferably variably, the limits of the motion or of the operation of the motorized drive assembly in accordance with how far the mass has advanced.

This object is attained in accordance with the invention by a controller wheel attached to the motion-transmitting component by way of a zero-distortion gear that converts the translational motion of the motion-transmitting component into a rotary motion on the part of the activating wheel and by at least one activating component on the controller wheel that engages at least one switch. The motion-converting zero-distortion gear between the motion-transmitting component and the controller wheel is basically anything along the lines of a positively interlocking gear that, subject to the occurring forces, will ensure zero-distortion, meaning non-slip, transmission of motion between the motion-transmitting component and the controller wheel. This extended sense is also to be construed as comprehending cogged gear.

The activating position between the activating components of the controller wheel and the switches, limit switches or even medial switches for example, is preferably variable either by displacing the switches in relation to the controller wheel, which will in that event itself be stationary, or by displacing the activating components in relation to the controller wheel if the switches are stationary, depending on the particular embodiment. The activating components in one preferred embodiment can simultaneously be associated with one or more eccentrics that are preferably coaxial with the controller wheel and secured to it by friction. To displace the activating components, accordingly, the eccentric or eccentrics is or are intentionally twisted against the force of the friction, preferably by means of adjuster components that engage the eccentrics by way of cogs, cogs on a beveled or spur wheel. The friction between the eccentric and the controller wheel is powerful enough to reliably force each eccentric against its associated controller wheel and maintain rotation without intentionally resorting to an adjuster component.

The motion-transmitting component in one especially preferred embodiment is provided with a set of cogs extending at an acute angle to the direction of translation of the motion-transmitting component and engaging another set of cogs distributed around the edge of the face of the controller wheel such that both sets constitute the engagement. The orientation of the cogs at an acute angle to the direction the motion-transmitting component moves in, slanting, that is, at only a slight slope away from the direction of motion, increases the transmission ratio between the distance traveled by the motion-transmitting component and the rotation of the controller wheel. It is simultaneously possible to structure the cogs along the circumference of the controller wheel in the form of spur-wheel cogs, cogs, that is, that extend parallel to the axis that the controller wheel rotates around. In another preferred embodiment, however, the orientation of the cogs in the set in the vicinity of the surface of the controller wheel is directed at an acute angle to its rotation such that, when the set on the motion-transmitting component engages the set on the controller wheel, its axis of rotation will extend parallel to the direction of translation of the motion-transmitting component.

It accordingly becomes possible to represent the longest distance traveled by the motion-transmitting component in terms of the rotation of the controller wheel. The controller wheel can accordingly function as a support for the components that activate the stationary switches. It now becomes possible for example in a preferred application of the drive mechanism to shift the panel of a door back and forth between its open position and its closed position with the controller wheel always executing only a slight fraction of a rotation. It is simultaneously preferable to mount the components that control the limit switches for the two door-panel positions on the controller wheel and revolving around its axis such that they can be secured at various settings, making it possible to exploit one drive mechanism for various door-panel routes and especially for precise adjustment of the door-panel route. This observation is of course similarly valid for the distances traveled by other masses that are to be shifted by the drive mechanism.

One particular approach to the design of the transmission, assumed herein as known, that converts a rotary into a translational motion is described in U.S. Pat. No. 4,726,247 for example and is utilized with particular preference within the scope of the present invention and its embodiments by way of example. It is a drive mechanism with a motion-transmitting device that is attached to the rotary drive mechanism in the vicinity of a track and longitudinally divided along the direction of motion into at least two strands that are at one end outside the track each separately deformable at an angle to the direction of the track and reassembled at the other end, mutually engaging and secured against lateral distancing one from the other. The mutual engagement, which is incorporated in a set of cogs, ensures that the motion-transmitting component can withstand both tension and compression from the mutually engaging strands in a way that is thoroughly explained in the aforesaid patent. Outside of the straight distance traveled, which is identified by the track, the strands are separate and diverted away from the direction of translational motion. This design is compact. For details and embodiments of this drive mechanism the reader is expressly referred to the total contents of the aforesaid patent.

The already described embodiments will, along with other preferred versions, be evident from the subsidiary claims, especially in conjunction with the examples depicted in the drawing and specified in the following description of the invention.

DESCRIPTION OF THE PREFERRED EMBODIMENTS

Figure 1:
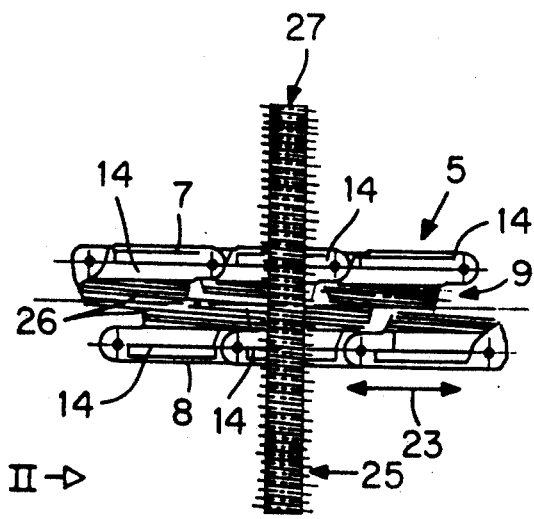
FIG. 1 is a schematic top view of the controller wheel and of that area of the motion-transmitting component of an otherwise unillustrated drive mechanism that engages it by way of cogs.
Figure 2:
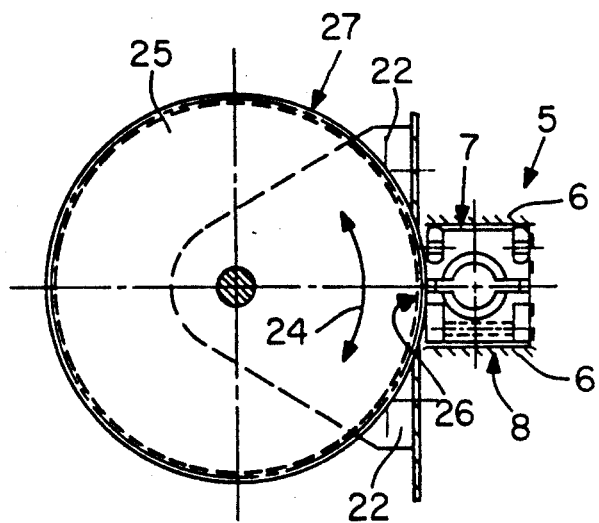
FIG. 2 is a schematic view in the direction indicated by arrow II in FIG. 1.
Figure 3:
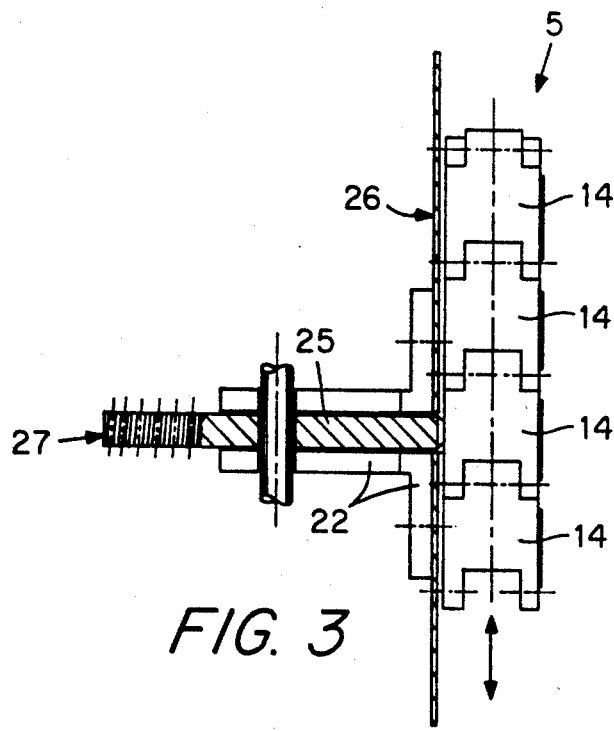
FIG. 3 is a view from an angle of 90° to the view in FIG. 2 with the controller wheel partly in section, allowing its axis to be seen from the side.
Figure 4:
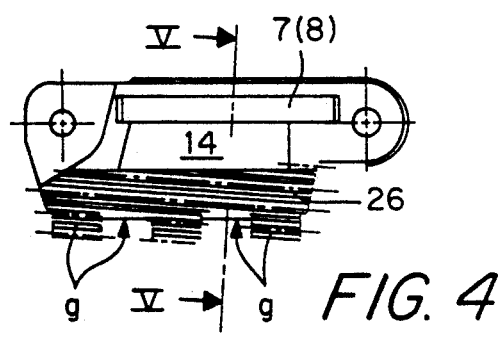
FIG. 4 is a side view of a section of one of the branches of the motion-transmitting component of the drive mechanism toward the side that enters into transmissional conjunction with the controller wheel.
Figure 5:
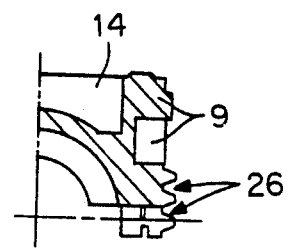
FIG. 5 is a partial section along the line V-V in FIG. 4.

FIGS. 1 through 5 illustrate, based on the transmission described in the aforesaid patent, a coupling between its motion-transmitting component 5 and a controller wheel 25 for measuring or limiting the distance traveled by the motion-transmitting component. Motion-transmitting component 5 comprises two strands 7 and 8, each of which consists of a chain of sequentially interarticulated links 14. The links 14 in strands 7 and 8 engage each other by way of a set 9 of cogs between the facing surfaces of the strands. The motion-transmitting component 5 in the unillustrated drive mechanism travels straight back and forth in the direction indicated by arrow 23. In order to convert this motion into a back-and-forth motion toward controller wheel 25 in the direction indicated by double-headed arrow 24 in FIG. 2, motion-transmitting component 5 has another set 26 of cogs with an orientation extending at an acute angle to the length of the motion-transmitting component, as will be especially evident from FIGS. 1 and 4. The face or surface of controller wheel 25 also has a set 27 of cogs that extend at an acute angle to the axis of rotation of controller wheel 25, as will be particularly evident from FIGS. 1 and 3. Controller wheel 25 rotates in a pillow block 22 secured in a track 6 that channels strands 7 and 8 straight into a situation wherein set 9 of cogs engages, such that the set 26 of cogs on motion-transmitting component 5 engages the set 27 of cogs on controller wheel 25, as will be particularly evident from FIGS. 2 and 3. The dot-and-dash lines in FIGS. 3 and 4 illustrate in particular the orientation of the cogs in sets 26 and 27. The partial section in FIG. 5 illustrates the structure of the cogs in set 26 for example. From the only slight deviation of the orientation of the cogs in set 26 from the length of the motion-transmitting component and from the just as slight deviation of the orientation of the cogs in the set 27 on controller wheel 25 from the direction of its axis it will be evident that, when set 26 engages set 27, the transmission ratio between the translational-motion section of motion-transmitting component 5 and the angle-of-rotation section of controller wheel 25 will be high. It accordingly becomes possible to convert the longest section of translational-motion transmission in the drive mechanism into a single rotation of the controller wheel. Such a 360° rotation of the controller wheel accordingly corresponds, when applied to a gate, to the maximum height of the gate, in the event of an articulated roof hatch for example.

Figure 6:
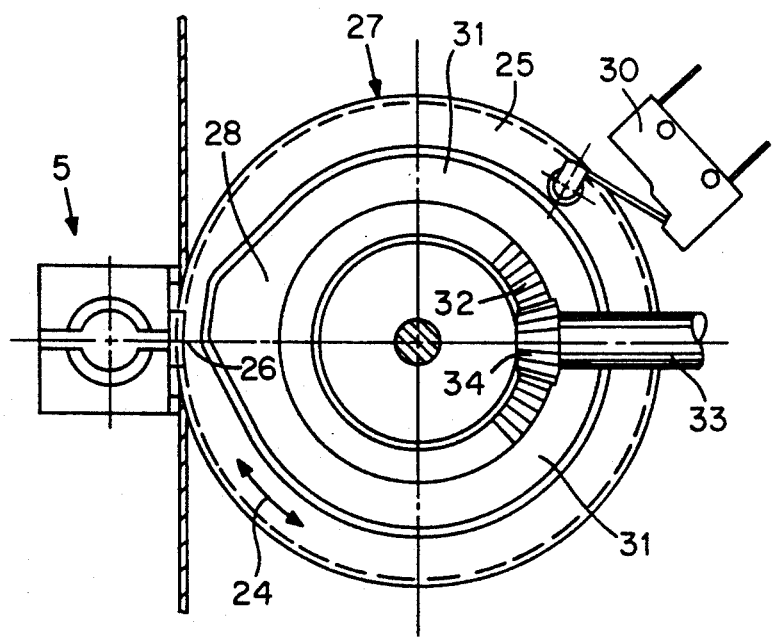
FIGS. 6 and 7 are a side view of and, perpendicular thereto, a section through an embodiment with an activating-component structure and controls.
Figure 7:
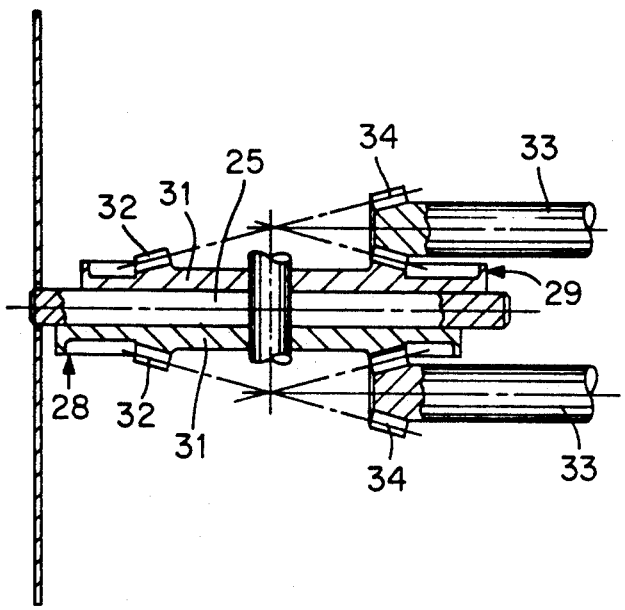
Figure 8:
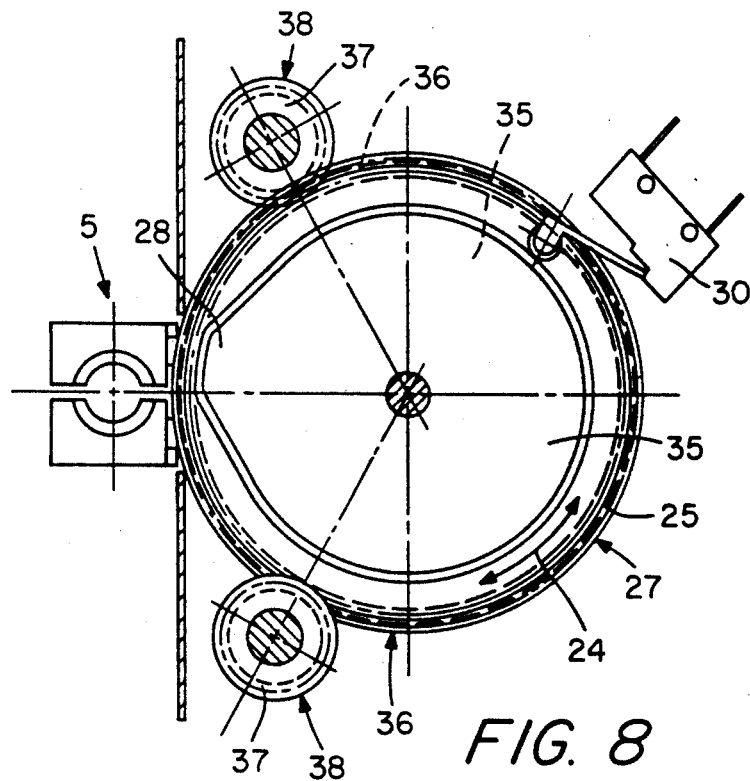
FIGS. 8 and 9 are a side view of and a partial section through another embodiment of an activating-component structure and controls.
Figure 9:
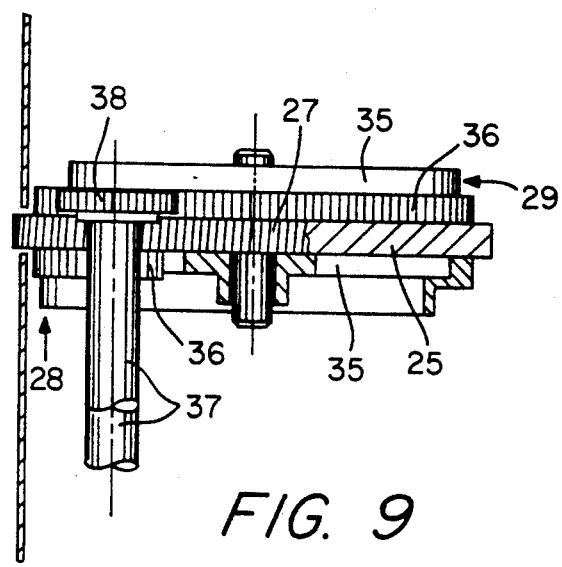
Figure 10:
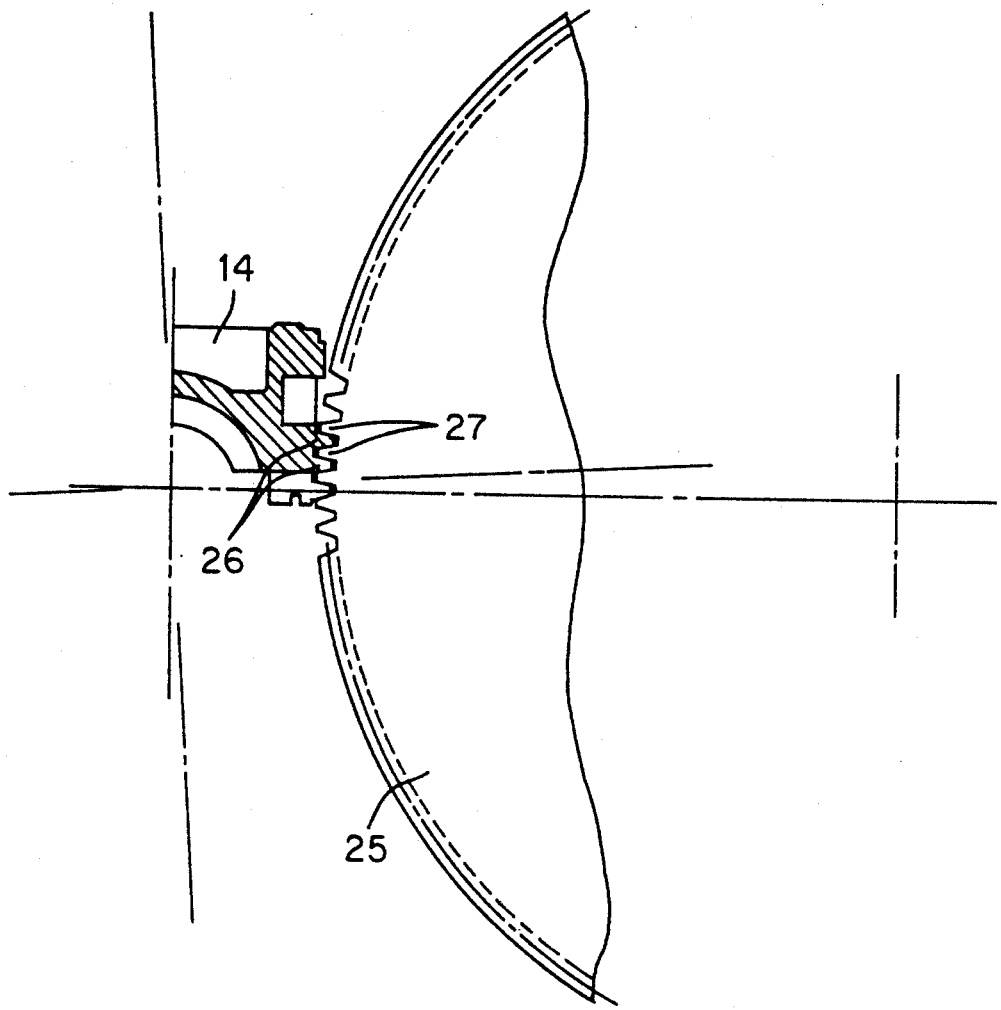
FIG. 10 is a partial sectional view and shows the meshing of two motion transmitting components shown in FIG. 1.

As demonstrated with reference to the example illustrated in FIGS. 6 and 7 and to the other especially illustrated in FIGS. 8 and 9, there is an eccentric 31 (FIGS. 6 and 7) or 35 (FIGS. 8 and 9) on each side of controller wheel 25 with cams that constitute activating components 28 and 29 and that are frictionally entrained by controller wheel 25. For this purpose the mutually contacting faces of the controller wheel and eccentrics can be appropriately roughened or friction-coated. The activating component 28, 29 of the cams extend into switches 30, of which only one is illustrated. These switches can be secured stationary at various or prescribed points, whereas the cams and hence activating components 28 and 29 can be adjusted circumferentially by turning cams 31 and 35 in opposition to the friction with the controller wheel, against the rubbing action, and establishing or setting strictly prescribed angles of rotation between the switches and the cams. Adjusting the relative rotation between the eccentrics and the controller wheel allows the cams to be adjusted to precisely the widest-open and farthest-closed positions of the door panel, and the eccentrics, acting so precisely on the limit switches, can electrically engage and disengage the drive mechanism at the correct instant.

The eccentrics 31 in the embodiment illustrated in FIGS. 6 and 7 have beveled-wheel crown gears 32 on the face toward controller wheel 25. Each beveled wheel 34 on a setting component 33, which is in the form of a shaft, engages a crown gear, as will be evident in particular from FIG. 7. The setting components can be twisted manually to position their associated eccentrics against the force of the friction at particular rotations in relation to controller wheel 25. Once established, such a setting will remain when operations on the eccentric are conducted from the controller wheel.

The eccentrics in the embodiment illustrated in FIGS. 8 and 9 have a section with cogs on the front. These frontal cogs 36 mesh with frontal cogs 38 on undulating adjuster components 37, the axes of which extend parallel to the axis of the controller wheel and which can also be twisted manually to vary the angle of rotation between each eccentric 35 and its associated controller wheel 25. Once adjusted, the eccentrics will be entrained due to the aforesaid friction with the controller wheel. Adjustment accordingly involves overcoming the friction. When controller wheel 25 is operated by way of motion-transmitting component 5, the adjuster components accompany the rotation without having to be manipulated by hand.

I claim:

1. A transmission for converting rotary motion into translational motion for connecting to motorized drive means to move loads along a predetermined and variable extent, comprising: rotary drive means and a translationally channeled motion-transmitting component connected to said rotary drive means through a positively interlocking transmitting articulation adjacent a track and driven by said rotary drive means; a controller wheel attached to said motion-transmitting component through gear means for converting translational motion of said motion-transmitting component into rotary motion; at least one switch and at least one activating component engaging said switch.

2. A transmission as defined in claim 1, wherein said controller wheel has first teeth distributed around an edge of a face of said controller wheel; second teeth on said motion-transmitting component and extending at an acute angle to a path of translational motion of aid motion-transmitting component and engaging said teeth of said controller; said first teeth of said controller wheel and said second teeth on said motion-transmitting component comprising said gear means.

3. A transmission as defined in claim 2, wherein said controller wheel has an axis of rotation, aid first teeth of said controller wheel extending at an acute angle to said axis of rotation so that when said first teeth engage said second teeth said axis of rotation extends parallel to a direction of translational motion of said motion-transmitting component.

4. A transmission as defined in claim 1, wherein said motion-transmitting component is longitudinally divided along a path of motion thereof into at least two strands having one end outside said track, each of said strands being separately deformable at an angle to an axis of said track and being united at another end, said strands being mutually engaged and secured against lateral spacing from each other.

5. A transmission as defined in claim 4, wherein each strand comprises a sequence of sections interarticulated so that when said strands are untied each section of a strand positively interlocks with a respective opposite section of the other strand to share tension and compression.

6. A transmission as defined in claim 4, wherein each strand has a continuous set of teeth throughout the strand and is deformable according to material of the strand and thickness of the strand in a section retained dependent on said set of teeth.

7. A transmission as defined in claim 5, wherein said motion-transmitting component has threaded means on at least one of said two strands and including one tooth-contour face of mutually engaging teeth in both said strands in an area extending substantially perpendicular to a direction of deformation of said strands.

8. A transmission as defined in claim 1, wherein said activating component can be set at various points along a circumference of said controller wheel.

9. A transmission as defined in claim 8, wherein said activating component is on at least one cam located coaxially to said controller wheel and engaging frictionally a front side of said controller wheel; bevel gear teeth with setting means for adjusting said cam by manual turning with respect to angle of rotation of said cam relative to said controller wheel.

10. A transmission as defined in claim 8, wherein said activating component is on at least one cam located coaxially to said controller wheel and engaging frictionally a front side of said controller wheel; frontal teeth with setting means for adjusting said cam by manual turning with respect to angle of rotation of said cam relative to said controller wheel.

* * * * *